(12) United States Patent
Imamura

(10) Patent No.: US 7,657,141 B2
(45) Date of Patent: Feb. 2, 2010

(54) PHOTONIC BANDGAP FIBER

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/191,362

(22) Filed: Aug. 14, 2008

(65) Prior Publication Data

US 2009/0080845 A1 Mar. 26, 2009

Related U.S. Application Data

(63) Continuation of application No. PCT/JP2007/068692, filed on Sep. 26, 2007.

(51) Int. Cl.
*G02B 6/02* (2006.01)
(52) U.S. Cl. ........................ 385/125; 385/123
(58) Field of Classification Search .............. 385/125, 385/123
See application file for complete search history.

(56) References Cited

U.S. PATENT DOCUMENTS

| 7,242,835 | B2 * | 7/2007 | Busse et al. .............. 385/125 |
| 7,295,740 | B2 * | 11/2007 | Sanghera et al. ........... 385/125 |
| 2002/0164136 | A1 * | 11/2002 | Fukuda et al. ............. 385/125 |
| 2004/0258381 | A1 * | 12/2004 | Borrelli et al. ............ 385/125 |

FOREIGN PATENT DOCUMENTS

JP 2007-009094 1/2007

OTHER PUBLICATIONS

Yoshihiro Tsuchida et al., "Dispersion-Flattened Photonic Crystal Fibers with Central Air-Hole", Institute of Electronics, Information, and Communication Engineers, No. 1., Mar. 3, 2003, p. 231, C-3-91, (English Translation included, 4 pp.).

P. J. Roberts et al., "Ultimate Low Loss of Hollow-core Photonic Crystal Fibres", Optics Express, vol. 13, No. 1, pp. 236-244, Jan. 10, 2005.

G. Humbert et al., "HollowCore Photonic Crystal Fibers for Beam Delivery", Optics Express, vol. 12, No. 8, pp. 1477-1484, Apr. 19, 2004.

* cited by examiner

*Primary Examiner*—Uyen-Chau N Le
*Assistant Examiner*—Rhonda S Peace
(74) *Attorney, Agent, or Firm*—Oblon, Spivak, McClelland, Maier & Neustadt, L.L.P.

(57) ABSTRACT

A photonic bandgap fiber includes a hollow core formed along a center axis of the photonic bandgap fiber, through which a light propagates and a cladding region made of silica glass. The cladding region includes air holes forming a triangular lattice arranged around the hollow core. A lattice constant of the triangular lattice of the air holes $\Lambda$ is equal to or smaller than 2.1 µm. Confinement loss in a predetermined wavelength range including a center wavelength of a photonic bandgap is lower than scattering loss.

4 Claims, 4 Drawing Sheets

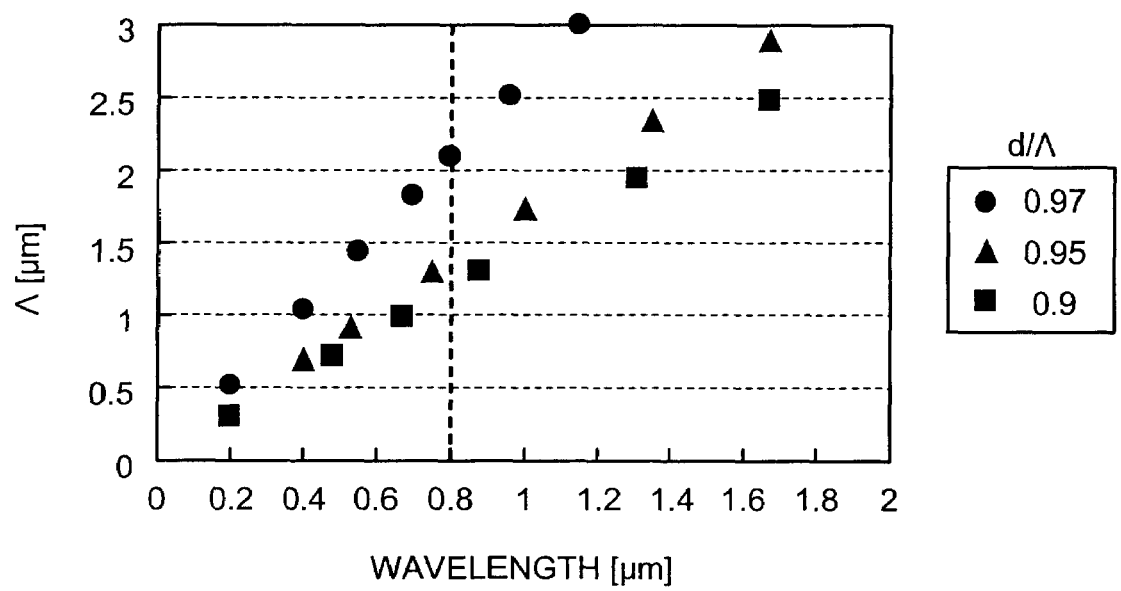

US 7,657,141 B2

PHOTONIC BANDGAP FIBER

CROSS-REFERENCE TO RELATED APPLICATIONS

This application is a continuation of PCT/JP2007/068692 filed on Sep. 26, 2007, the entire content of which are incorporated herein by reference.

BACKGROUND OF THE INVENTION

1. Field of the Invention

The present invention relates to a photonic bandgap fiber including a hollow core for propagating a light formed along a center axis of a cladding region and air holes periodically arranged around the hollow core.

2. Description of the Related Art

A light in a wavelength range from ultraviolet to visible light (ultraviolet to visible range) is used in a wide range of fields, such as medical care, biotechnology, sensing, measurement, optical recording, and material machining.

From among the above fields, for example, as an application for radiation measurement, an optical waveguide for guiding a light in the ultraviolet range over a relatively long distance is used. More specifically, in facilities such as a nuclear reactor in which radiation is generated, it is a subject of great importance to measure and control intensity of radiation to ensure safety of people and the facilities. Particularly, in the case of performing a regular inspection of the reactor, for example, which necessitates a person to actually go into the reactor to perform an inspection work, it is necessary to measure the intensity of radiation in advance to ensure safety. Therefore, in the case of measuring the radiation in the reactor, a scintillator that converts the radiation into a fluorescence is installed, the fluorescence emitted by the scintillator is guided to a safe location using an optical waveguide, and the amount of a guided fluorescence is measured to obtain the intensity of radiation.

The wavelength of fluorescence emitted by the scintillator is about 0.4 µm to 0.55 µm. As the optical waveguide to guide the light in this wavelength range over a relatively long distance, for example, about 100 m, a plastic optical fiber or a silica-based optical fiber widely used for the field of optical communication is used.

On the other hand, in the field of optical communication using a light in an infrared region, as an optical transmission line, a photonic bandgap fiber (PBGF) is actively researched. The photonic bandgap fiber includes a hollow core for propagating a light formed along the center axis of the fiber and air holes periodically arranged around the hollow core. By forming a Bragg grating with the periodically arranged air holes and creating a bandgap by Bragg reflection from the grating, a light is confined within the hollow core so that the light propagates through the hollow core (see, for example, P. J. Roberts, et al., "Ultimate low loss of hollow-core photonic crystal fibres" Optics Express, v. 13, no. 1, pp. 236-244 (2004) and G. Humbert, et al., "Hollow core photonic crystal fibers for beam delivery" Optics Express, v. 12, no. 8, pp. 1477-1484 (2004)).

As described above, there is a wide range of fields using the light in the ultraviolet to visible range, and thus an optical waveguide capable of guiding the light in this wavelength range with low loss is highly required. However, a current silica-based optical fiber has a high transmission loss of 30 dB/km or more at, for example, a wavelength of 0.4 µm. In addition, the plastic optical fiber has an even higher transmission loss, and therefore there is a problem of limitation in an optical waveguide distance.

SUMMARY OF THE INVENTION

It is an object of the present invention to at least partially solve the problems in the conventional technology.

According to an aspect of the present invention, there is provided a photonic bandgap fiber including a hollow core formed along a center axis of the photonic bandgap fiber, through which a light propagates, and a cladding region made of silica glass. The cladding region includes air holes forming a triangular lattice arranged around the hollow core. A lattice constant $\Lambda$ of the triangular lattice of the air holes is equal to or smaller than 2.1 micrometers. The confinement loss in a predetermined wavelength range including a center wavelength of a photonic bandgap is lower than scattering loss.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a graph showing a relationship between a center wavelength of a bandgap and a value of $\Lambda$ to obtain the center wavelength in a PBGF having the same structure as that of the PBGF shown in FIG. 1.

DETAILED DESCRIPTION OF THE PREFERRED EMBODIMENTS

Exemplary embodiments of a photonic bandgap fiber according to the present invention are explained in detail below. It is noted that the present invention is not limited by the embodiments. Hereinafter, the photonic bandgap fiber is referred to as a PBGF. The ultraviolet to visible range indicates a wavelength of 0.2 µm to 0.8 µm.

Figure 1:
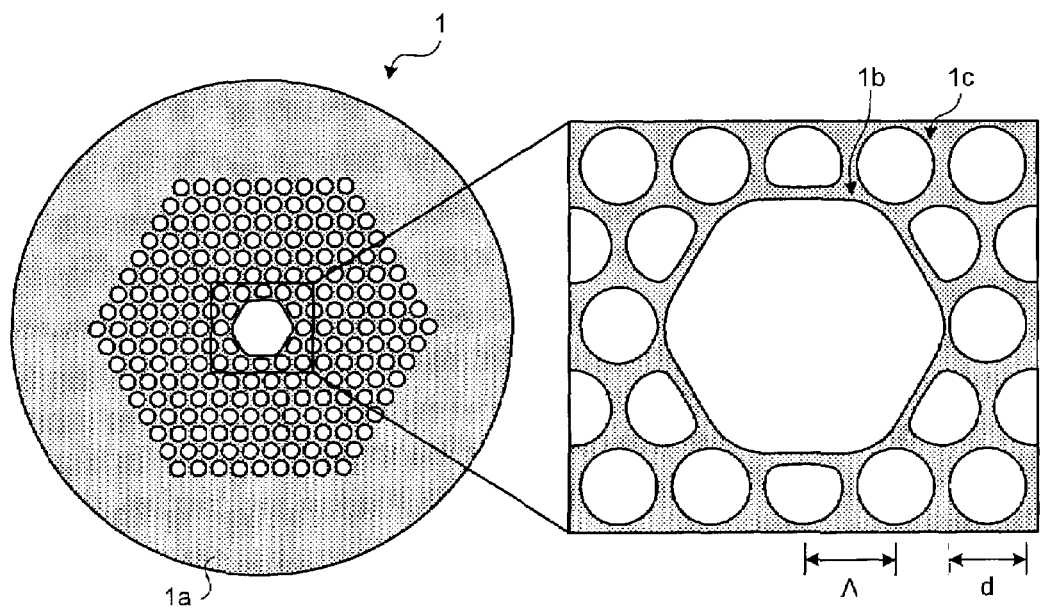
FIG. 1 is a schematic cross section and an enlarged center area of a PBGF according to an embodiment of the present invention.

FIG. 1 is a schematic cross section and an enlarged center area of a PBGF 1 according to an embodiment of the present invention. The PBGF 1 transmits a light having a wavelength of 0.4 µm with low loss. As shown in FIG. 1, the PBGF 1 includes a hollow core 1b for propagating a light formed along the center axis of the PBGF 1 and a cladding region 1a formed around the hollow core 1b. The cladding region 1a is formed with air holes 1c periodically arranged in silica glass and the silica glass covering the periphery of the air holes 1c.

The periphery of the cladding region 1a is provided with a coating (not shown) made of UV-curing resin or the like.

The air holes 1c are arranged to form a triangular lattice. The diameter of the air holes 1c is d, and a lattice constant of the triangular lattice is Λ. On the other hand, the shape of the hollow core 1b is an equilateral hexagon whose vertexes are rounded with the size virtually equivalent to the size that is occupied by one of the air holes 1c and six surrounding air holes closest to the hole. The air holes 1c are arranged in a plurality of equilateral hexagonal layers surrounding the hollow core 1b, and in the present embodiment, the air holes 1c are arranged in a seven-layer structure.

In the PBGF 1, Λ is set to 1.05 μm, and d/Λ is set to 0.97, and as a result, a bandgap with a center wavelength of 0.4 μm is formed, and confinement loss is 10 dB/km or less over a 40 nm-wavelength range including the wavelength of 0.4 μm. Furthermore, because the PBGF 1 has the structure shown in FIG. 1, majority of the light is confined within the hollow core 1b and propagates through the core. Consequently, the scattering loss due to the silica glass during propagation of light is as low as about 13 dB/km in the 40 nm-wavelength range, which means that the confinement loss is lower than the scattering loss. Furthermore, absorption loss caused by the electron transition in the silica glass is remarkably low. Therefore, the PBGF 1 is low in transmission loss including the confinement loss, the scattering loss, and the absorption loss over the 40 nm-wavelength range including the wavelength of 0.4 μm, and thus the light in the wavelength range can be guided with low loss.

According to P. J. Roberts, et al., "Ultimate low loss of hollow-core photonic crystal fibres" Optics Express, v. 13, no. 1, pp. 236-244 (2004), the transmission loss of the PBGF is caused by scattering loss mainly on the surfaces of air holes, and it is theoretically and experimentally proved that the wavelength dependency of the scattering loss is proportional to $1/\lambda^3$, where λ is the wavelength. Furthermore, a currently available PBGF realizes low transmission loss of 1.2 dB/km at a wavelength of 1.62 μm, however it is indicated that by optimizing the core structure, the transmission loss can be reduced to about 0.2 dB/km. On the other hand, in an ordinary silica-based optical fiber in which the core and the cladding are made of silica glass, the Rayleigh scattering loss is generated by the silica glass forming the core, and it is known that the Rayleigh scattering loss shows wavelength dependency of $1/\lambda^4$.

Figure 2:
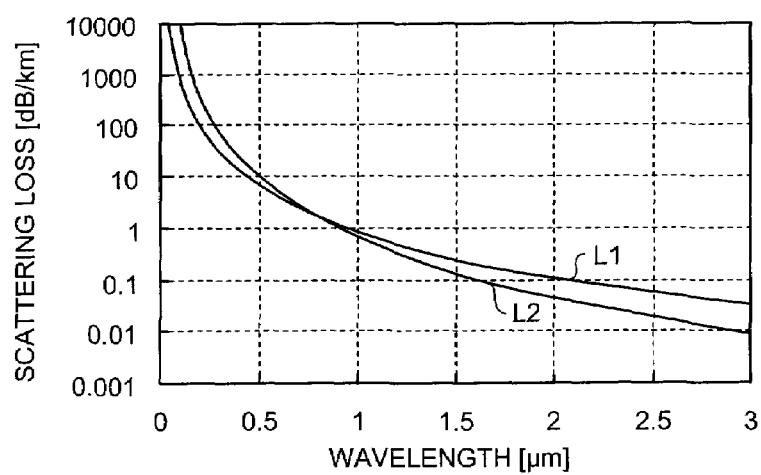
FIG. 2 is a graph showing wavelength dependency of scattering loss in the PBGF and in an ordinary silica-based optical fiber.

The inventors of the present invention have focused their attention on a difference between properties of the scattering loss in the PBGF and in the ordinary silica-based optical fiber, and have examined the wavelength dependency of the scattering loss in both cases. FIG. 2 is a graph showing wavelength dependency of scattering loss in the PBGF and in the ordinary silica-based optical fiber. A line L1 indicates the scattering loss on the surfaces of the air holes of the PBGF, and a line L2 indicates the Rayleigh scattering loss in the silica-glass core of the ordinary silica-based optical fiber. On the line L1, the scattering loss at the wavelength of 1.62 μm is about 0.2 dB/km. As shown in FIG. 2, in the wavelength range shorter than a wavelength of 0.8 μm, namely, in the wavelength range of visible light or shorter, values on the line L1 are lower than those on the line L2, which indicates a possibility that the transmission loss of the PBGF is lower than the transmission loss of the silica-based optical fiber.

In the silica glass, the optical loss is increased due to the absorption of ultraviolet accompanied by the electron transition. In the case of the ordinary silica-based optical fiber, the influence of the absorption loss is significantly large. However, because 99% or more of the guided light propagates through the hollow core in the case of the PBGF and the light propagating in the silica glass is as small as about 1%, it is considered that the influence of the absorption loss due to electron transition is considerably small.

Furthermore, when the optical fiber is used for the radiation measurement, it is predicted that there may occur a problem that when the optical fiber is used for a long time in an environment with the radiation, the radiation itself causes a defect in the silica glass and optical loss thereby increases. However, in the case of the PBGF in which light propagates through the hollow core, it is predicted that the increase in the optical loss due to such defect is small, and therefore it is thought that the PBGF has merits of lower loss compared with the ordinary silica-based optical fiber. To prevent degradation of a coating due to the radiation, the coating should be preferably made of silicon.

Therefore, the inventors of the present invention have focused their attention on that the PBGF has the possibility of guiding the light in the ultraviolet to visible range with lower loss for the above-mentioned reasons, and as a result of diligent research on this matter, the inventors have achieved the present invention.

The PBGF 1 according to the present embodiment is more specifically explained below with reference to a result of simulation using a finite element method (FEM).

Figure 3:
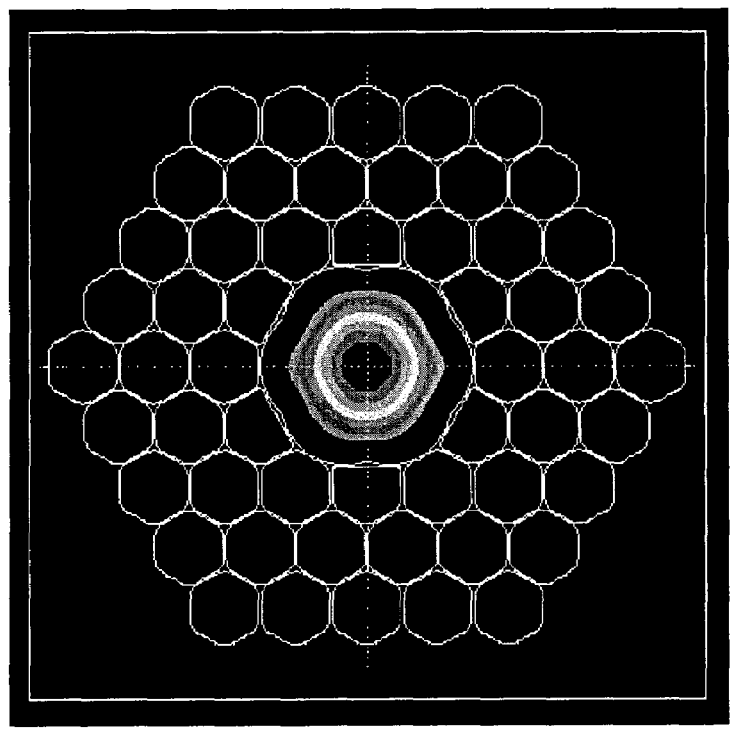
FIG. 3 is a schematic diagram of a field distribution of a light within the cross section of the PBGF in a first calculation example.

As a first calculation example, a result of calculation of wavelength dependency of confinement loss of the PBGF is explained first for a PBGF having the same structure as that of the PBGF 1 shown in FIG. 1, in which Λ is set to 1.05 μm, d/Λ is set to 0.97, and the air holes are arranged in three layers. FIG. 3 is a schematic diagram of a field distribution ($E_x$ distribution) of a light within the cross section of the PBGF in the first calculation example. In FIG. 3, the lighter region indicates the higher intensity of the field. As shown in FIG. 3, majority of the light is confined within the hollow core located at the center of the PBGF in the first calculation example, however a part of the light leaks from the hollow core.

Figure 4:
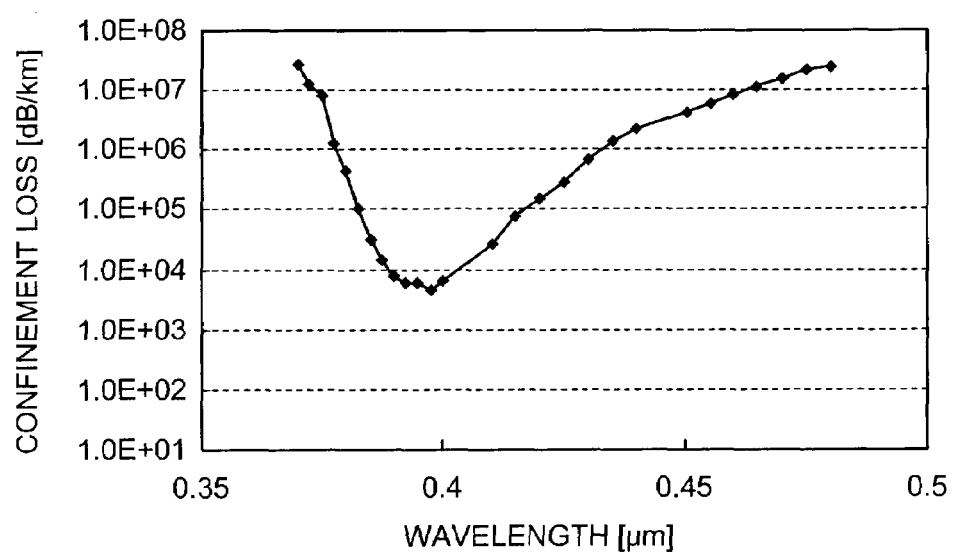
FIG. 4 is a graph showing wavelength dependency of confinement loss of the PBGF in the first calculation example.

FIG. 4 is a graph showing wavelength dependency of confinement loss of the PBGF in the first calculation example. As shown in FIG. 4, it is confirmed that by setting Λ to 1.05 μm and d/Λ to 0.97 in the PBGF in the first calculation example, the confinement loss is minimized near the wavelength of 0.4 μm with a formation of a bandgap. However, because the PBGF in the first calculation example includes only three layers of the air holes, as shown in FIG. 3, the light leaks from the hollow core, and the confinement loss within the bandgap is as high as 1000 dB/km or more.

Figure 5:
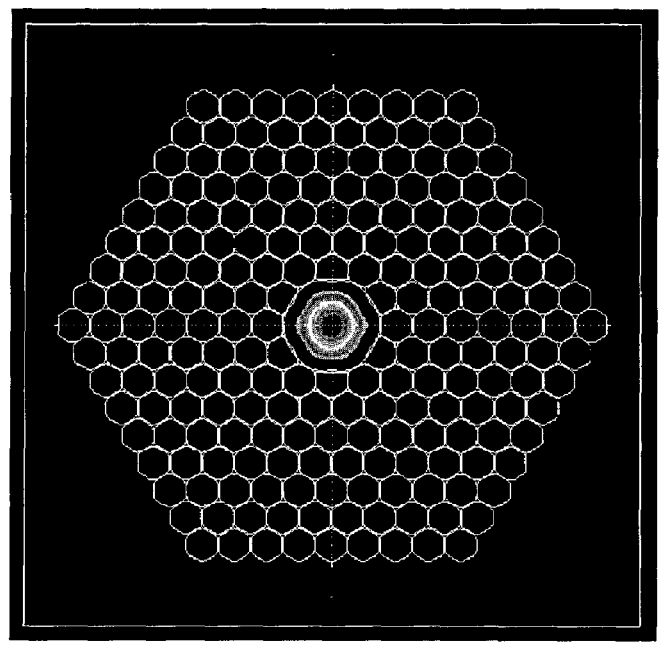
FIG. 5 is a schematic diagram of a field distribution of a light within the cross section of the PBGF in a fifth calculation example.

As a second to a fifth calculation examples, results of calculation of wavelength dependency of confinement loss of the PBGF are explained next for PBGFs having the same structure as that of the PBGF 1 shown in FIG. 1, in which Λ is set to 1.05 μm, d/Λ is set to 0.97, and the air holes are arranged in four to seven layers, respectively. FIG. 5 is a schematic diagram of a field distribution ($E_x$ distribution) of a light within the cross section of the PBGF having seven layers of air holes in the fifth calculation example. As shown in FIG. 5, majority of the light is confined within the hollow core located at the center of the PBGF in the fifth calculation example.

Figure 6:
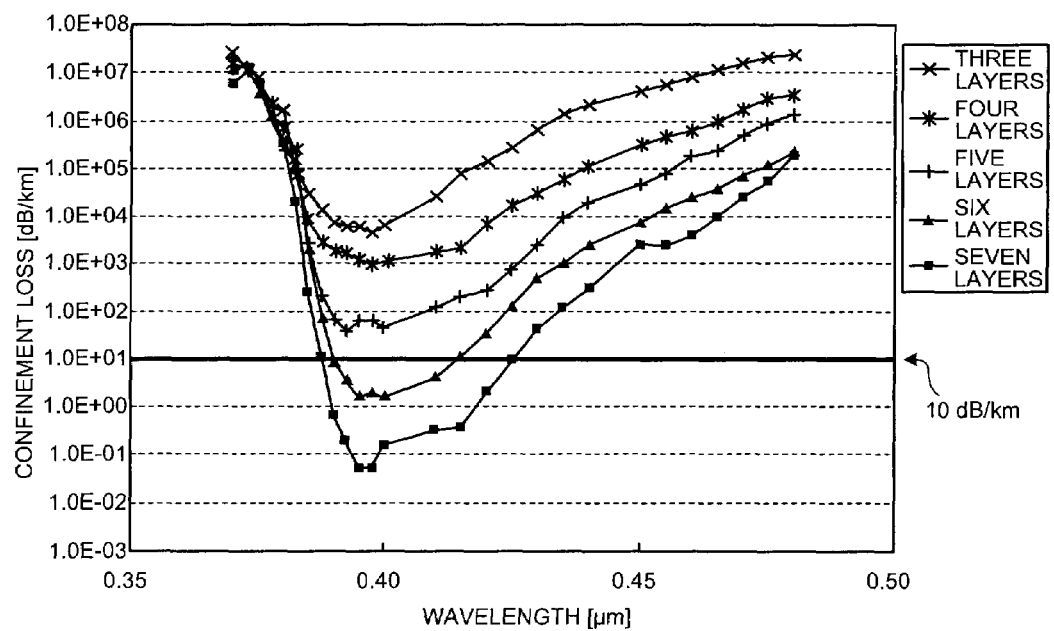
FIG. 6 is a graph showing wavelength dependency of confinement loss of the PBGF in a second to the fifth calculation examples.

FIG. 6 is a graph showing wavelength dependency of confinement loss of the PBGFs in the second to the fifth calculation examples. As shown in FIG. 6, the confinement loss decreases as the number of layers of the air holes increases. As shown in FIG. 2, the scattering loss of the PBGF at the wavelength of 0.4 μm is about 13 dB/km, and thus, if the confinement loss is 10 dB/km or less, it is considered that the value is acceptable compared to the scattering loss. Therefore, as shown in FIG. 6, if the PBGF has six or more layers of the air holes, the confinement loss in the wavelength range including the center wavelength of the bandgap becomes 10 dB/km or less, which makes it possible to realize allowable confinement loss. The wavelength range in which the confinement loss is 10 dB/km or less is 25 nm when the number of layers is six, and is 40 nm when the number of layers is seven in the same manner as the PBGF according to the first embodiment. Furthermore, if the number of layers is seven, it is possible to realize extremely low confinement loss of about 0.1 dB/km. The effective area of the PBGFs in the second to the fifth calculation examples is about 3.5 $\mu m^2$ at the wavelength of 0.4 $\mu m$, which is almost constant regardless of the number of layers.

In the above explanation, the reason why $\Lambda$ is set to 1.05 $\mu m$ and $d/\Lambda$ is set to 0.97 is to obtain the center wavelength of the bandgap of 0.4 $\mu m$, and thus, $\Lambda$ and $d/\Lambda$ can be set as appropriate according to a desired center wavelength of the bandgap.

FIG. 7 is a graph showing a relationship between the center wavelength of the bandgap and the value of $\Lambda$ to obtain the center wavelength in a PBGF having the same structure as that of PBGF 1 shown in FIG. 1, where $d/\Lambda$ is set to 0.97, 0.95, and 0.9. As shown in FIG. 7, if $\Lambda$ is set to 2.1 $\mu m$ or less, the center wavelength can be shorter than the visible light range, namely, 0.8 $\mu m$ or less. If $d/\Lambda$ is increased, $d/\Lambda$ should be preferably set to 0.97 or less because the thickness of the glass between the air holes is decreased.

When $d/\Lambda$ is set to 0.97 or less, $\Lambda$ needs to be 1.05 $\mu m$ or less to obtain the center wavelength of the bandgap of 0.4 $\mu m$.

The PBGF according to the present embodiment can be easily fabricated by using the well-known stack and draw method. More specifically, silica-glass capillary tubes for forming the air holes are arranged in a triangular lattice shape in a silica-glass jacket tube, and thereafter, one capillary tube located near the center axis of the jacket tube and six capillary tubes around the one capillary tube are removed, an equilateral hexagonal hollow portion is thereby formed as the hollow core, to prepare a preform, and then the preform is drawn to fabricate the PBGF.

As described above, according to an aspect of the present invention, it is possible to realize a photonic bandgap fiber capable of guiding a light in an ultraviolet to visible range with low loss.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A photonic bandgap fiber, comprising:
   a hollow core formed along a center axis of the photonic bandgap fiber, through which a light propagates; and
   a cladding region made of silica glass, the cladding region including air holes forming a triangular lattice arranged around the hollow core, wherein
   a lattice constant $\Lambda$ of the triangular lattice of the air holes is equal to or smaller than 1.05 micrometers,
   the fiber is configured to have a confinement loss for the light that is less than a scattering loss, and the light has a predetermined wavelength range which includes a center wavelength of a photonic bandgap,
   the center wavelength is 0.4 micrometers,
   a ratio $d/\Lambda$ equal to or larger than 0.9 and the ratio $d/\Lambda$ is equal to or smaller than 0.97, and
   d is a hole diameter of the air holes.

2. The photonic bandgap fiber according to claim 1, wherein the confinement loss is equal to or smaller than 10 dB/km.

3. The photonic bandgap fiber according to claim 2, wherein the air holes are arranged in a plurality of equilateral hexagonal layers surrounding the hollow core, and a number of the equilateral hexagonal layers is six or more, and
   wherein the predetermined wavelength range is at least 20 nanometers and the confinement loss is at most 10 dB/km.

4. The photonic bandgap fiber according to claim 1, wherein the air holes are arranged in a plurality of equilateral hexagonal layers surrounding the hollow core, and a number of the equilateral hexagonal layers is six or more, and
   wherein the predetermined wavelength range is at least 20 nanometers and the confinement loss is equal to or smaller than 10 dB/km.

* * * * *